(12) United States Patent
Vallath et al.

(10) Patent No.: US 9,451,651 B2
(45) Date of Patent: Sep. 20, 2016

(54) MANAGEMENT OF MULTIPLE RADIO ACCESS BEARER SESSIONS IN COMMUNICATION SYSTEM

(75) Inventors: Sreevalsan Vallath, Dublin, CA (US); Arthur Brisebois, Cumming, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 1022 days.

(21) Appl. No.: 13/271,845

(22) Filed: Oct. 12, 2011

(65) Prior Publication Data

US 2013/0094371 A1    Apr. 18, 2013

(51) Int. Cl.
*H04W 76/02*   (2009.01)
*H04W 68/00*   (2009.01)

(52) U.S. Cl.
CPC .......... *H04W 76/027* (2013.01); *H04W 68/00* (2013.01); *H04W 76/026* (2013.01)

(58) Field of Classification Search
CPC .............................. H04W 4/00; H04W 24/00
USPC .................................................. 370/252, 328
See application file for complete search history.

(56) References Cited

U.S. PATENT DOCUMENTS

| 8,437,748 | B2 * | 5/2013 | Brisebois et al. | ............ 455/418 |
| 2007/0258427 | A1 * | 11/2007 | Shaheen et al. | ............. 370/338 |
| 2011/0217969 | A1 * | 9/2011 | Spartz et al. | ............. 455/422.1 |
| 2012/0069750 | A1 * | 3/2012 | Xing et al. | ..................... 370/252 |
| 2012/0224552 | A1 * | 9/2012 | Feuersanger et al. | ........ 370/329 |
| 2012/0264397 | A1 * | 10/2012 | Meredith et al. | ............. 455/410 |
| 2012/0302223 | A1 * | 11/2012 | Austin et al. | ................. 455/418 |
| 2013/0023260 | A1 * | 1/2013 | Shu et al. | ..................... 455/418 |

OTHER PUBLICATIONS

Owens, Des. Evaluate the Pre-Launch Performance of Your Mobile Devices. Published online Mar. 19, 2010. http://mobiledevdesign.com/tutorials/evaluate-pre-launch-performance-031910/index2.html, 3 pages.
Metrico. Call Performance & Voice Quality Measurement System. Published online. http://www.metricowireless.com/services/meascallvoice.cfm, 10 pages.
Ericsson. Tower mounted amplifier. Brochure, 2 pages.
Spirent Communications Inc. Spirent 8100 Mobile Device Test System, 2010. Brochure, 8 pages.

* cited by examiner

*Primary Examiner* — Alex Skripnikov
(74) *Attorney, Agent, or Firm* — Amin, Turocy & Watson, LLP

(57) ABSTRACT

A system and methodology that can limit and manage the number of multiple radio access bearer (mRAB) initiations, which are transitions from a Circuit Switched (CS) voice session, is provided. Moreover, the system, within a Radio Access Network (RAN), can identify vulnerable radio conditions for a user equipment (UE) on an uplink (UL) and/or a downlink (DL), and then subsequently determines whether a Packet Switched (PS) data session is allowed to pass through to the UE, during a CS voice call. In addition, the system can temporarily block a network-initiated data request to the existing CS voice call, if the voice call is likely to be dropped on initiating an mRAB. As the vulnerable radio conditions improve, the system can deliver the previously blocked data request to the UE.

20 Claims, 11 Drawing Sheets

MANAGEMENT OF MULTIPLE RADIO ACCESS BEARER SESSIONS IN COMMUNICATION SYSTEM

TECHNICAL FIELD

The subject disclosure relates to wireless communications and, more particularly, to management of multiple radio access bearer (mRAB) initiations, in a wireless communication system.

BACKGROUND

Universal Mobile Telecommunications System (UMTS) networks have seen an explosive data growth in the past few years and, in the future, are expected to see continuing growth in the Packet Switched (PS) domain. Communication devices can now operate on these robust networks to access data applications (over a PS data bearer) during a voice call (over a circuit switched (CS) voice bearer). This is referred to as multiple radio access bearer (mRAB) calls. Due to the acceleration in demand and use of mobile data applications (e.g., NetFlix, YouTube, Facebook, etc.), the number of short bursty packet sessions are growing exponentially, and most often, these packet sessions are initiated while a user is on a CS voice bearer. Typically, mRAB calls drop at much higher rate than voice only calls. Increased rate in dropped calls causes user frustration and dissatisfaction, and can adversely affect service providers' businesses.

While it's possible to bridge some of the gaps with optimization techniques, conventional systems cannot fully close the inherent radio link budget gap of approximately 1.6-1.9 decibel (dB) for mRAB versus voice only calls. From a competitive positioning point of view, especially with Code Division Multiple Access (CDMA) based technologies, the UMTS Common Pilot Channel (CPICH) coverage presents about a 6 dB advantage over a CDMA pilot coverage. However, in conventional systems, such coverage advantage cannot be leveraged due to coverage degradation during mRAB calls. Moreover, when a PS radio access bearer (RAB) is added to a voice bearer, coverage degradation is mainly due to the lower spreading factor, thus lower spreading gain, or due to the multi-code usage on the uplink (UL).

Conventional systems simply focus on (a) Improving link budget using lower rate speech codecs and lower rate data bearers; (b) Improving the power allocation for signaling radio bearers (SRB); and/or (c) Pro-actively reconfiguring the PS bearer of an mRAB session in order to maintain the speech session. Limitations with solutions mentioned above are as follows: (a) There is an inherent link budget issue that cannot be fully bridged. Wireless carriers have traditionally built their network based on coverage boundaries required to support speech services. When a user has an mRAB connection, the coverage at cell edges will be reduce by approximately 1.6-1.9 dB, which results in a higher probability for session drops under these conditions; (b) 3rd Generation Partnership Project (3GPP) specifies beta parameters that determine the power allocation ratios for the control channel (DPCCH) versus data channel (DPDCH). This is done to ensure support of minimum data rates even at cell borders. Any effort to allocate more power on SRB (DPDCH) compared to SRB (DPCCH) will have adverse consequences for data rate support at cell edge; and (c) Processes involved in reconfiguring an existing mRAB to a speech only bearer will likely put the user equipment (UE) at risk of increased call drops. This is due to the inherent implementation logic of treating radio bearer reconfiguration activities at a higher priority than mobility events that are required to maintain the best link budget for the session.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later. It will also be appreciated that the detailed description may include additional or alternative embodiments beyond those described in this summary.

The systems and methods disclosed herein, in one aspect thereof, can facilitate management of multiple radio access bearer (mRAB) session for a user equipment (UE) in a radio access network (RAN). In one aspect, the system can include a paging management component that receives data from the UE, indicative of a state and/or quality of a voice call. Moreover, if the voice call is likely to be dropped on (or after) initiation of an mRAB session, the UE can be marked as being in a "vulnerable" state. Further, the paging management component can monitor paging requests directed to the UE and can block, reject, delay, deny, and/or queue, the received paging requests, during the time that the UE is in the vulnerable state. In one aspect, after the vulnerability state has transpired and/or the voice call has been terminated, new incoming paging requests can be delivered to the UE along with the previously queued paging requests.

Another aspect of the disclosed subject matter relates to a method that can be employed to facilitate paging management to improve circuit switched (CS) communication. The method can comprise monitoring various parameters, for example, uplink (UL) transmission power, signal to interference ratio (SIR) target, signal to noise (SNR) target, UL quality, downlink (DL) quality, ratio of received pilot energy (Ec) to the total power spectral density (Io), received signal core power (RSCP), etc. Further, the method can comprise comparing the parameters to corresponding thresholds, and determining whether one or more of the threshold is exceeded. Moreover, a report can be delivered to a network controller if determined that one or more of the threshold have been exceeded. The report can be analyzed and the UE can be flagged as being in a vulnerable state. In addition, the method can comprise monitoring data requests received from a packet core network switching element, and prohibiting or temporarily delaying, delivery of the data requests to any UE that is flagged as being in a vulnerable state.

The following description and the annexed drawings set forth certain illustrative aspects of the specification. These aspects are indicative, however, of but a few of the various ways in which the principles of the specification may be employed. Other novel features of the specification will become apparent from the following detailed description of the specification when considered in conjunction with the drawings.

DETAILED DESCRIPTION

Figure 1:
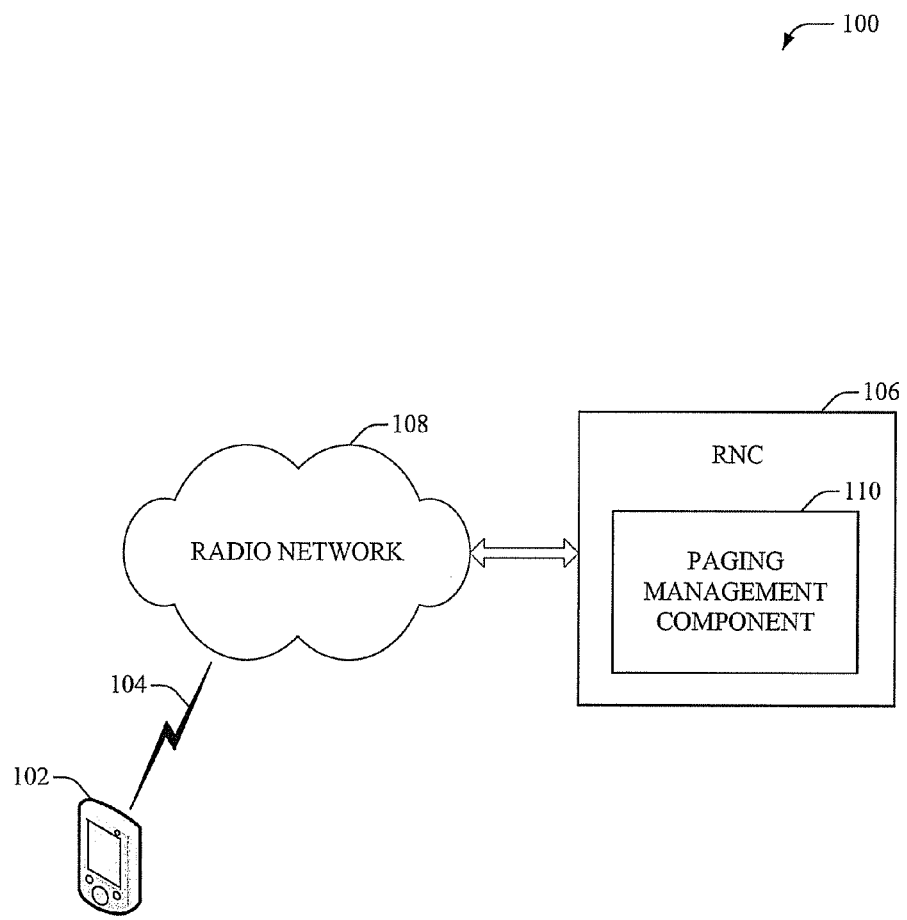
FIG. 1 illustrates an example system that facilitates management of multiple radio access bearer (mRAB) simultaneous voice and data transitions of a user equipment (UE).

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" and/or "exemplary" is used herein to mean serving as an example, instance, or illustration. Any aspect or design described herein as "example" and/or "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. Further, the terms "vulnerable state," "vulnerability state," and the like are also employed interchangeably throughout the subject specification, unless context warrants particular distinction(s) among the terms.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms "data flow," "data session," and the like are also employed interchangeably throughout the subject specification, unless context warrants particular distinction(s) among the terms.

The systems and methods disclosed herein can implement a Radio Access Network (RAN) based solution to limit and manage the number of multiple Radio Access Bearer (mRAB) initiations that are transitions from a Circuit Switched (CS) voice session. Moreover, the solution can include detection of vulnerable radio conditions for a user equipment (UE) on uplink (UL) and/or downlink (DL), based on which it can be determined whether a data (Packet Switched (PS)) session(s) is allowed to pass through to the UE. Further, the solution can include prohibiting network-initiated data request(s) to existing voice calls, only if the call is deemed to be in a vulnerable state (e.g., likely to drop, if mRAB allowed).

Aspects or features of the subject innovation can be exploited in substantially any wireless communication technology; e.g., Universal Mobile Telecommunications System (UMTS), Code division multiple access (CDMA), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects of the subject innovation can be exploited in legacy telecommunication technologies.

Referring initially to FIG. 1, there illustrated is an example system 100 that can facilitate management of mRAB simultaneous voice and data transitions of a UE, according to an aspect of the subject specification. Moreover, system 100 can prevent and/or delay a network-initiated data request to a UE 102 handing an existing voice call, in response to identifying that the voice call is in a vulnerable state. The example embodiments described herein can refer to a UMTS network; however, it can be appreciated that the subject innovation is not so limited and most any communication network can be utilized beyond a UMTS network.

In one aspect, a UE 102 can be coupled to a network node, for example, a radio network controller (RNC) 106 via a radio network 108. As an example, the radio network 108 can include a set of base stations or access points, to which the UE 102 can connect wirelessly over air link 104 and/or via a wired connection (not shown). According to an embodiment, a paging management component 110 can be utilized to intelligently control UE transitions to mRAB simultaneous voice and data, as explained in detail infra. Although the paging management component 110 is depicted to reside within the RNC 106, it can be appreciated that the paging management component 110 can be externally coupled to the RNC 106 or can reside within most any other network element (e.g., access points, a serving GPRS support node (SGSN), Mobility Management Entity (MME), etc). Those skilled in the art will understand that the configuration of FIG. 1 is a simplified example only and that the disclosure may operate on a network that has a complete set of network elements and interfaces, such as that described in detail below.

As an example, UE 102 can include most any electronic communication device such as, but not limited to, most any consumer electronic device, for example, a digital media player, a digital photo frame, a digital camera, a cellular phone, a personal computer, a tablet computer, a personal digital assistant (PDA), a smart phone, a laptop, a gaming system, etc. Further, UE 102 can also include LTE-based devices, such as, but not limited to, most any home or commercial appliance that includes an LTE radio. It can be appreciated that the UE 102 can be mobile, have limited mobility and/or be stationary. In one aspect, the UE 102 can access data applications simultaneously during a voice call. In other words, the voice channel (also known as a voice bearer) can operate at the same time that one or more applications access a data bearer on the UE 102. According to an embodiment, this mRAB call utilizes different spreading factors across the various radio active bearer configurations. For example, the higher rate packet switched radio active bearer can generally utilize a lower spreading factor, and therefore lower processing gains. However, this spreading factor can be used across the entire physical channel, which includes the logical channels (e.g., the circuit switched radio active bearer and the signaling radio bearer) that are mapped onto that physical channel. The lower spreading factor can correlate to a lower processing gain for the signaling radio bearer.

Moreover, during mRAB calls, the signaling between the radio network 108 and the UE 102 is significantly increased and frequent radio bearer reconfigurations can be performed, which in conventional systems slow updates to the control link between the radio network 108 and the UE 102. If the packet switched bearer is dropped during such updates, there can be an interrupted data flow. In addition, if the signaling radio bearer breaks down even momentarily, for example, due to the increased signaling, there can be dropped voice call (e.g., interruption of the CS radio bearer). Accordingly, to prevent dropped calls, the subject system 100 actively manages mRAB calls to minimize the stress on the signaling radio bearer and thus minimize the possibility of a dropped voice call, by utilization of the paging management component 110.

According to an embodiment, the paging management component 110 receives data, from the UE 102, indicative of a state of the UE 102 during a voice call. For example, during a voice call, the UE 102 can monitor, retrieve, receive, and/or identify, various parameters, such as, but not limited to, its surrounding environment, radio conditions, operating environment, active usage of data applications by a user, etc. Based on an analysis of one or more of these parameters, it can be determined (e.g., by the UE 102, and/or the RNC 106) whether the voice call is in a vulnerable state. A vulnerable state can be indicative that the voice call is likely to be or at risk of being dropped, have Quality of Service (QoS) below a predefined threshold, break up, etc. In one aspect, a notification can be provided to the paging management component 110, for example, by the UE 102 or the RNC 106, indicative of the vulnerability state. Further, the paging management component 110 can monitor incoming paging request(s), such as, but not limited to network-initiated data requests (e.g., received from the SGSN, MME etc.). Furthermore, the paging management component 110 can lookup, identify, or determine the vulnerability status of a UE (e.g., UE 102), to which the incoming paging request(s) are directed. In one embodiment, on identifying or determining a vulnerable state of the UE 102, the paging management component 110 can reject, block, hold, delay, deny and/or queue these paging requests until the vulnerability state has expired and/or the voice call has been terminated. In one aspect, it can be determined (e.g., by the UE 102, and/or RNC 106) that the UE 102 is no longer in the vulnerable state, for example, due to sensing, determining, or identifying, an improvement in the various parameters. Under this condition, the paging management component 110 can receive and forward incoming paging request(s) to the UE 102, even in the presence of an active voice call. In addition, at this point a previously received paging request(s), cached or queued, by the paging management component 110 during the vulnerability state, can be transmitted or delivered to the UE 102. Further, new packet data units (PDUs) and/or paging requests received from the core network can also be forwarded to the UE 102 without restriction by the paging management component 110.

Figure 2:
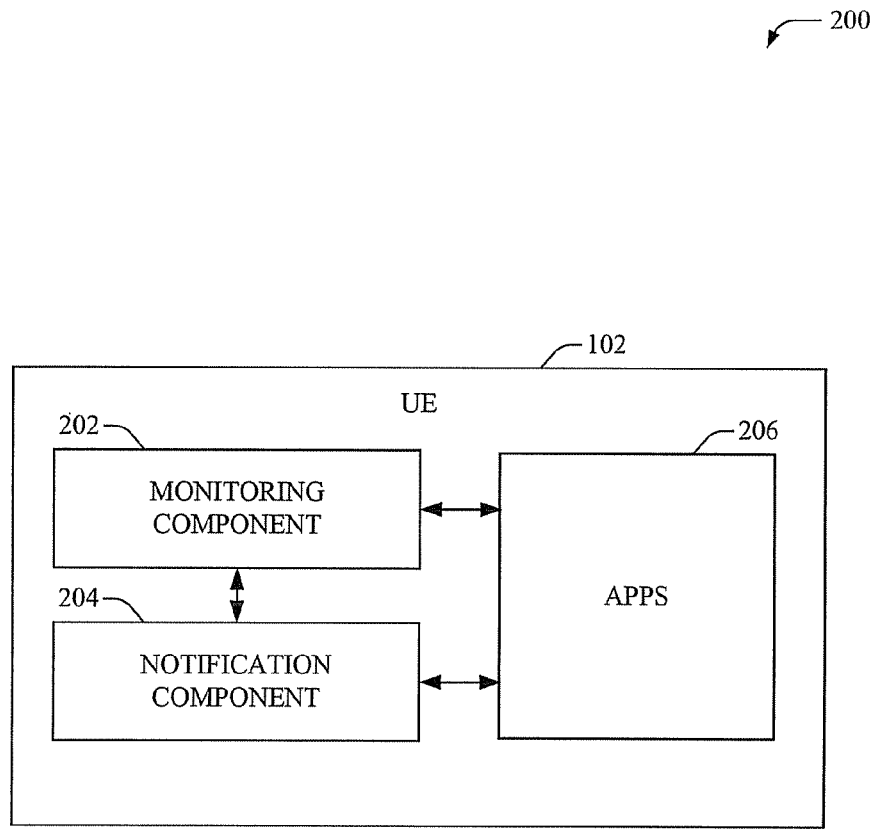
FIG. 2 illustrates an example system that can be employed for observing parameters, which are employed to detect poor conditions for a voice call.

Referring to FIG. 2, there illustrated is an example system 200 that can be employed for observing parameters that are employed to detect poor conditions for a voice call in accordance with an aspect of the subject disclosure. It can be appreciated that the UE 102 can include functionality, as more fully described herein, for example, with regard to system 100. As discussed herein, in one example, the UE 102 can be connected to the mobile core network through a wireless radio access network, such as, but not limited to UMTS Terrestrial Radio Access Network (UTRAN). Moreover, the UE 102 can include most any mobile and/or stationary, wireless and/or wired, electronic communication device (e.g., cell phone, PDA, tablet, PC, laptop, etc.).

The UE 102 can communicate via both a voice channel and a data channel. For example, the UE 102 can simultaneously and/or concurrently implement and/or establish packet switched (PS) and circuit switched (CS) sessions. In other words, a user can access (e.g., transmit and/or receive) data for applications (apps) 206, during a CS voice call. Apps 206 can include application software, typically designed to help the user to perform specific tasks. Apps 206 can be bundled with the UE 102 and its system software, or can be published and sold/accessed separately. In one example, the apps 206 can be pre-installed on the UE 102 during manufacture or provisioning, received/modified via an over-the-air (OTA) update, or downloaded from various software distribution platforms. Example apps 206 can include, but are not limited to, applications relating to email clients, navigation, streaming music or video, social networking, news feeds, games, local weather, and the like. In an example embodiment, one or more apps 206 on the UE 102 can pull or otherwise access information on one or more network servers (e.g., application servers, content servers, web servers, email servers, etc.). In another example embodiment, one or more network servers can push information to the apps 206 on the UE 102. For example, an email client can periodically receive information regarding status of contacts in address book, a news feed can be updated with breaking news, and/or a weather application can receive current temperature at a current location. It can be appreciated that PS sessions are not limited to data exchange between apps 206 and the core network, but can include most any packet switched communications between the UE 102 and the communication network. The data channel can employ multiplexing, such as but not limited to, time division multiplexing, frequency division multiplexing, time-frequency division multiplexing, etc. for multiple apps 206 running simultaneously.

According to an embodiment, the UE 102 can comprise a monitoring component 202 that can monitor, sense, and/or observe various parameters, during a voice call. In one example, the monitoring component 202 can be activated when a voice call is initiated and/or established. As an example, the monitoring component 202 can sense the radio environment surrounding the UE 102 and measure an uplink and/or downlink power. In addition, the monitoring component 202 can compare the measurements with predefined (e.g., by the service provider or user) thresholds. For example, UE transmission power can be compared with an uplink threshold, and/or signal to interference ratio (SIR) target can be compared to a SIR threshold. Additionally or alternatively, the monitoring component 202 can determine the ratio of received pilot energy (Ec) to the total power spectral density (Io), and/or a received signal core power (RSCP), and compare the Ec/Io ratio and/or the RSCP with corresponding thresholds. In one example, to maximize the event based measurement entities supported for Wideband-CDMA (W-CDMA), it is possible to limit monitoring and measurement to look at reported SIR target on the UL, since the UL is typically the weaker link (compared to the DL).

Further, the UE 102 can include a notification component 204 that can report the measurements and/or comparison results to an element in the core network, for example, the RNC 106. In one example, the notification component 204 can transmit the monitored data associated with the surrounding radio environment, collected by the monitoring component 202, to the RNC 106. In this example scenario, the RNC 106 can analyze the monitored data (e.g., by comparisons with predefined threshold(s)) to determine whether the voice call on the UE 102 is in a vulnerable state. Alternatively, in another example, the monitoring component 202 can compare the monitored data with corresponding thresholds and the notification component can report events to the RNC 106, only when one or more of the corresponding thresholds are exceeded. For example, the notification component 204 can generate and transmit various measurement reports, when uplink threshold on UE transmission power is exceeded (e.g., Threshold on Event 6A), when UE transmission power exceeds a predefined threshold of W dBm, when the SIR target exceeds X dB, when Reported Ec/Io threshold is below Y dB or when reported RSCP is below Z dBm (wherein W, X, Y, and Z can be most any numerical value predefined and/or dynamically modified by the service provider). Moreover, the RNC 106 analyzes the reported data and prevents network-initiated data requests to be transferred to the UE 102 and/or application data to be delivered to the UE 102.

It can be appreciated that the monitoring component 202 is not limited to monitoring a radio environment and can monitor various other parameters. For example, monitoring component 202 can monitor an available bandwidth (e.g., in wired or wireless communication). In another example, the monitoring component 202 can obtain sensor data relating to position/orientation/motion of the UE 102 or the user. Moreover, the monitoring component 202 can determine that the apps 206 are not actively being used (e.g., running in the background), if detected that the UE 102 is up against the user's head. In this example scenario, the RNC 106 can temporarily suspend data communications across the data channel of the UE 102, for example, until the position of the UE 102 or user is changed. Other conditions, which can indicate to the RNC 106 that data communications can be suspended, include, any conditions indicating that the user is not actively utilizing or interacting with the data applications. For example, the conditions can include, but are not limited to, the display being turned off, a video associated with the apps 206 not being presented in the foreground of the display, the user not being in close proximity with the UE 102, etc. These conditions can be detected by the monitoring component 202 and delivered to the RNC 106 by the notification component 204. In one aspect, the user may opt to suspend or not to suspend data communications during a voice call.

Figure 3:
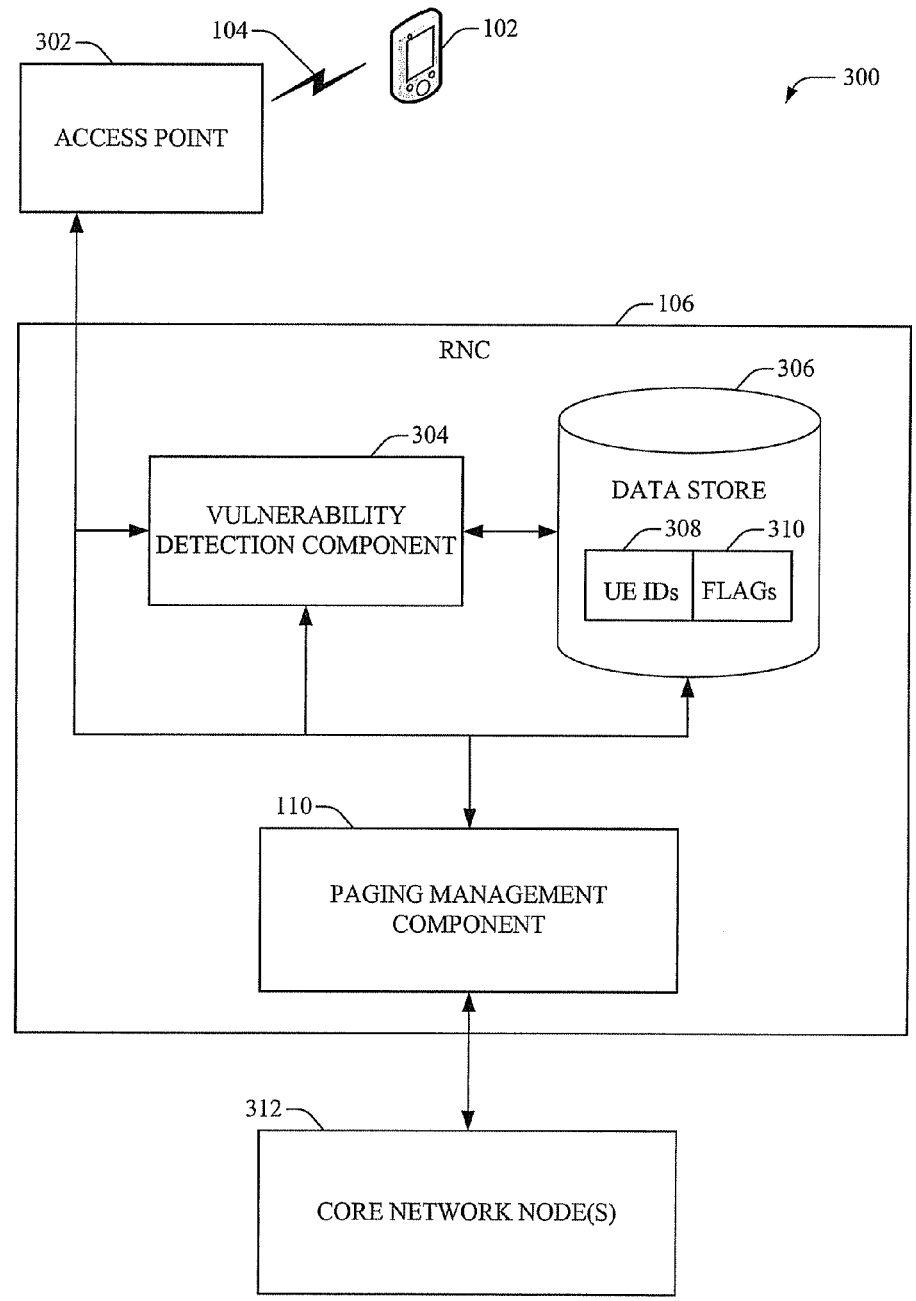
FIG. 3 illustrates an example system that facilitates paging management to improve circuit switched communication.

Referring now to FIG. 3, there illustrated is an example system 300 that can facilitate paging management to improve CS communication, according to an aspect of the subject disclosure. Specifically, system 300 can monitor, sense, and/or determine radio conditions, network load, and/or user interaction associated with a UE 102, during a voice call, and deny/suspend network-initiated data communications to the UE 102, if determined that the voice call has poor quality and/or that the quality of the voice call will be degraded below a predefined threshold on communicating the data request. Moreover, UE 102, RNC 106, and the paging management component 110 can include functionality, as more fully described herein, for example, with regard to systems 100 and 200.

In one embodiment, UE 102 can communicate over a voice channel and a data channel simultaneously. Often times, for example, during poor surrounding radio conditions, heavy network load, low available bandwidth, etc., the communication (e.g., voice call) on the voice channel may be dropped due to the communication on the data channel. To avoid this scenario, system 300 can prevent network-initiated communication on the data channel, until the quality of the communication on the voice channel is improved. In one aspect, UE 102 (e.g., via monitoring component 202 and notification component 204) can report a poor quality event and/or measurement data to the RNC 106, via an access point 302 (e.g., base station, femto access point, Node B, etc.). According to an embodiment, a vulnerability detection component 304 can be employed to identify vulnerable radio conditions for the UE 102 on UL and/or DL, based on an analysis of the data received from the UE 102 (via notification component 204).

Vulnerability can refer to the likelihood, risk, or probability that a voice call in the current conditions/scenarios would be dropped in response to simultaneous communication on a data bearer. If the likelihood, risk, or probability is high (e.g., above a predefined threshold), the UE 102 is identified to be in a vulnerable state. In other words, the UE 102 is in a vulnerable state if determined that the voice call with the UE 102 is likely to drop if mRAB is allowed. In one example, vulnerability detection component 304 can flag the UE 102 based on one or more of the following measurement reports: (a) When uplink threshold on UE transmission power is exceeded (e.g., Threshold on Event 6A is received), when UE transmission power exceeds a threshold X dBm, and/or when SIR target exceeds W dB; and/or (b) when downlink quality is poor, for example, when reported Ec/Io threshold is less than Y dB or when reported RSCP is less than Z dBm. It can be appreciated that the comparisons between the measurements and the thresholds can be performed by the monitoring component 202 in the UE 102 (as described with respect to FIG. 2 herein) and/or by the vulnerability detection component 304. Moreover, on detecting that the UE 102 is in a vulnerable state, the vulnerability detection component 304 can store an identifier (ID) 308 associated with the UE 102, such as but not limited to, a Subscriber identity Module (SIM), International Mobile Subscriber Identity (IMSI), device ID, Universal Subscriber Identity Module (USIM), etc. along with a flag 310, in a data store 306. In one example, flag 310 can include one or more bits that are used to store a binary value and/or code that has an assigned/predefined meaning. In particular, the value of the flag 310 can represent one of several possible states or statuses (e.g., a normal, state or a vulnerable state) of the corresponding UE ID 308. For example, if the flag 310 is set, the UE with UE ID 308, can be in a vulnerable state, and if the flag 310 is not set, the UE can be in a normal state. It can be appreciated that although only two states are indicated, the flag 310 can be utilized to indicate multiple states, for example, different gradations of a vulnerable state. Although shown to reside within RNC 106, it can be appreciated that the data store 306 can be externally coupled to the RNC 106 via a local or remote communication network.

According to an embodiment, the paging management component 110 can monitor all incoming communication requests from a core network node 312, for example, a packet core switching element (e.g., a SGSN or MME). The communication requests can include, but are not limited to, Type-2 paging requests and/or "PUSH" notifications received from the network or the application, which are usually sent to maintain synchronization between applications and/or databases. Moreover, the communication requests can be most any request that is not initiated by the user of UE 102. Since the requests are not user-initiated, the temporary blocking of these requests/notifications is unlikely to be perceived by the user. Accordingly, on receiving the request/notification, the paging management component 110 can determine whether the destination (or source) UE is flagged in the data store 306. On detecting that the UE (e.g., UE 102) is flagged to be in a vulnerable state, the incoming paging request/notification from the core network node 312 can be rejected, blocked, delayed, temporarily suspended, etc. Moreover, the paging management component 110 does not notify the core network node 312 on the paging rejects, and thus the core network node 312 can reattempt the pages (e.g., requests and/or notifications) during a time period as per a repetition timer setting(s) chosen by the operator/service provider. After this period, since the paging management component 110 has blocked, delayed, or temporarily suspended the request, the core network node 312 may not receive a response or acknowledgement from the RNC 106 and the core network node 312 can enter an operating mode, which may be referred to as a "Quarantine" mode, for example, with respect to the UE 102.

During the "Quarantine" mode, no new paging attempts are made to the UE 102 unless a new packet data unit (PDU) is initiated by the user. In an embodiment, one or more parameters pertaining to repeated paging frequency, paging gaps and quarantine period timer can be standardized and/or operator settable. Moreover, the operator/service provider can set and/or dynamically modify these values to suit the application mix, network quality and committed end user experience. According to an aspect, the paging management component 110 generally does not block user-initiated data requests for flagged UEs. Accordingly, user-initiated data requests can be handled by the core network node 312, even in the "Quarantine" mode. Thus, the system 300 can allow downgrade from mRAB to voice RAB, provided it can be determined that a request was not customer-initiated.

In an embodiment, the data store 306 can include volatile memory(s) or nonvolatile memory(s), or can include both volatile and nonvolatile memory(s). By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases, caches) of the subject systems and methods is intended to comprise, without being limited to, these and any other suitable types of memory.

Figure 4:
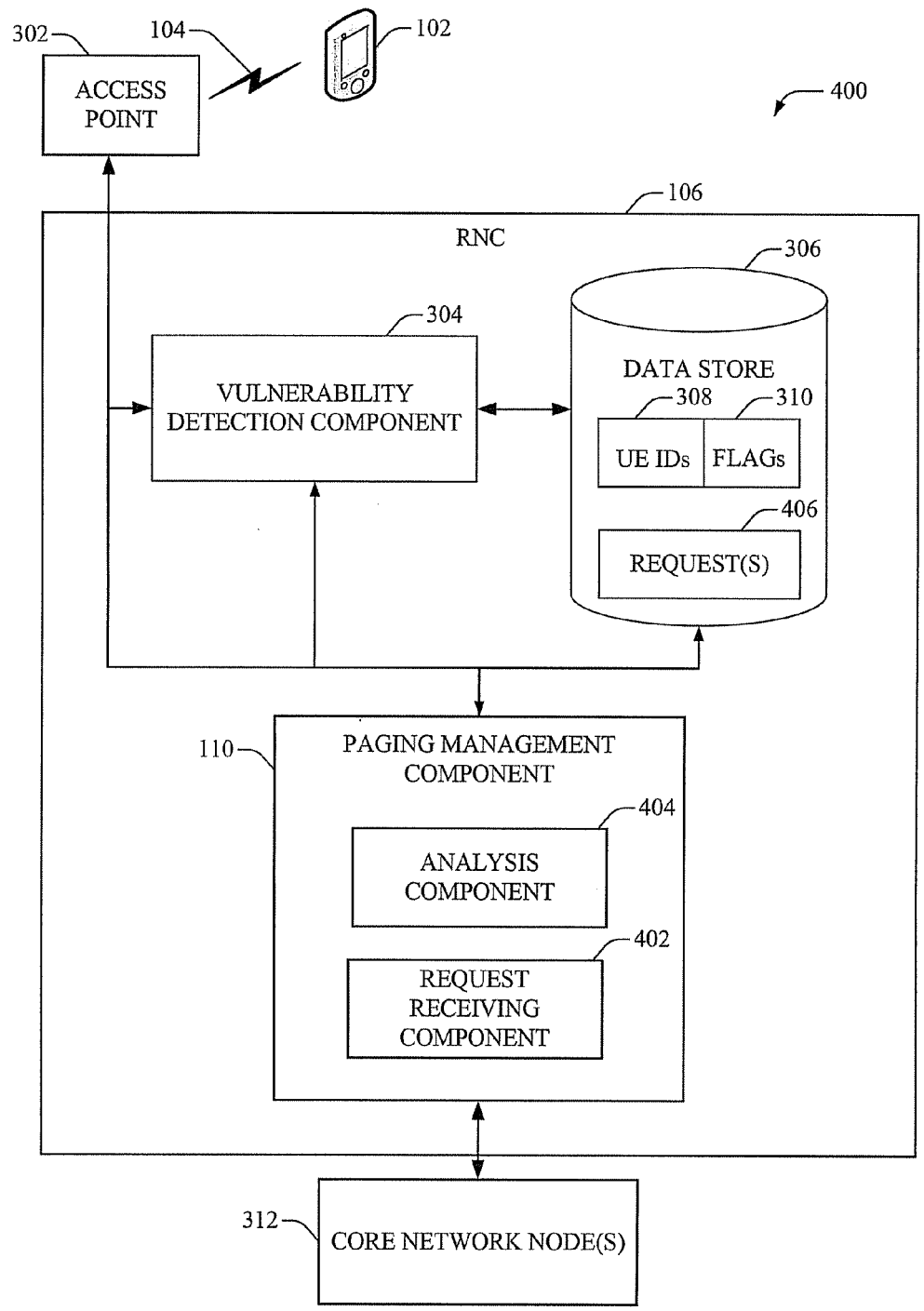
FIG. 4 illustrates an example system that temporarily delays communication over a data channel, when a UE is identified to be in a vulnerable state.

FIG. 4 illustrates an example system 400 that can temporarily delay communication over a data channel when a UE 102 is identified to be in a vulnerable state, according to an aspect of the subject innovation. Specifically, system 400 can receive various factors, such as, but not limited to, surrounding radio environment, network bandwidth, user interaction, network load measurements, UE location, position, and/or orientation, etc., to identify whether a UE 102 is in a vulnerable state. Moreover, UE 102, RNC 106, paging management component 110, access point 302, vulnerability detection component 304, data store 306, UE IDs 308, flags 310, and core network node(s) 312 can include functionality, as more fully described herein, for example, with regard to systems 100, 200, and 300.

In one aspect, the paging management component 110 can include a request receiving component 402 and an analysis component 404. It can be appreciated that the request receiving component 402 and analysis component 404 can be implemented as a single component or as two or more components without departing from example embodiments of the subject disclosure. The request receiving component 402 can monitor and track all requests/notifications (e.g., pages) received at the RNC 106, for example, from a PS core network node 312. On receiving a request/notification associated with a UE (e.g., UE 102), the analysis component 404 can determine whether request/notification is to be rejected, held in a cache (at 406), or forwarded to the UE. In an example embodiment, the analysis component 404 can identify whether the UE is flagged as being in a vulnerable state based on data (308, 310) retained in the data store 306. In one example, based on a service provider or user policy, the request 406 can be stored in the data store 306, if determined that the UE is currently in a vulnerable state. Moreover, by combining the logic to track the radio conditions the UE is currently experiencing with the capability to handle a mRAB session, the RNC 106 can make an a priori estimation of the probability of retention of the mRAB bearer. The analysis component 404 employs this network information to control a policy, of when to permit a UE to enter an mRAB state, implemented at the RNC level.

Further, if the vulnerability state has terminated, for example, when radio conditions and/or network loads are within a satisfactory/acceptable range for mRAB, and/or the voice call is terminated, the UE 102 can report (via notification component 204) back to the RNC 106. Under these conditions, the vulnerability detection component 304 can remove the flag 310 associated with the ID of the UE 102, and the UE 102 will be allowed to receive incoming pages via the paging management component 110, for example, even in the presence of an active voice call. At this point, the cached paging requests 406 in the data store 306 can be transmitted to the UE 102. Moreover, new PDUs/paging requests from the core network node 312 can also be forwarded without restriction by the paging management component 110. Accordingly, by constantly monitoring the UE radio state (via monitoring component 202) and receiving measurement reports (via notification component 204), the RNC 106 can move the UE 102 in and out of a vulnerability state dynamically. As the radio propagation and/or interference environment changes rapidly, the policy enforcement blocking pages (via the paging management component 110) is only temporary, and can be reinstated, as soon as the UE 102 is in better radio conditions.

Figure 5:
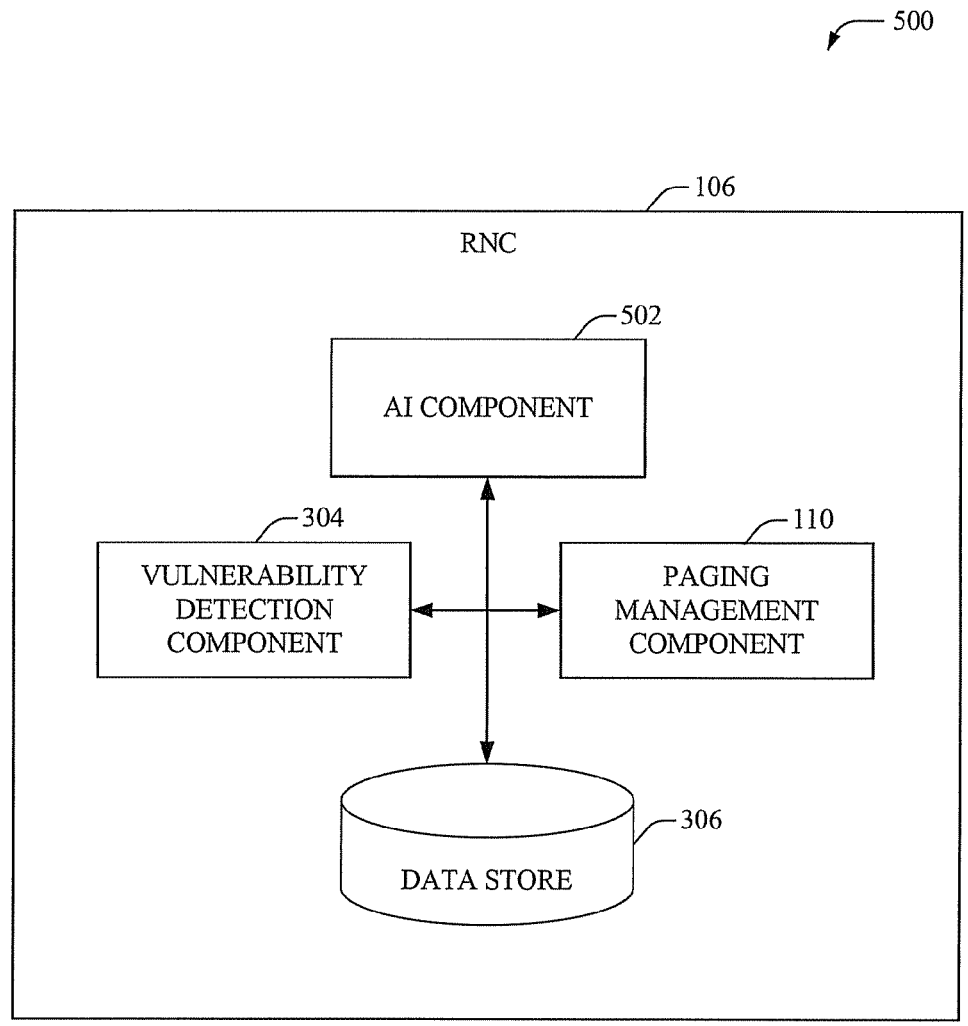
FIG. 5 illustrates an example system that facilitates automating one or more features in accordance with the subject innovation.

FIG. 5 illustrates an example system 500 that employs an artificial intelligence (AI) component 502, which facilitates automating one or more features in accordance with the subject innovation. It can be appreciated that the RNC 106, paging management component 110, vulnerability detection component 304, and data store 306 can include respective functionality, as more fully described herein, for example, with regard to systems 100-400.

An example embodiment (e.g., in connection with determining vulnerability, detecting whether to delay or reject a PS data request) can employ various AI-based schemes for carrying out various aspects thereof. For example, a process for determining whether to delay a data transmission on a data channel, or identify a state of an active voice call of a UE, can be facilitated via an automatic classifier system and process. Moreover, the classifier can be employed to determine how long the data transmission is to be delayed, when to forward the data transmission to the UE, when to block the data transmission, the probability of a voice call being dropped (or degraded below a preset threshold) on (or in response to) initiating an mRAB session, etc.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of communication systems, for example, attributes can be information (e.g., monitored information, user interactivity, etc.) collected by UE 102 or information (e.g., flags) stored in data store 306, and the classes can be categories or areas of interest (e.g., levels of priorities, type of applications associated with the data transmission, etc.).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, an example embodiment can employ classifiers that are explicitly trained (e.g., via a generic training data) as well as implicitly trained (e.g., via observing UE behavior, user interaction, application behavior/activity, application characteristics, receiving extrinsic information, etc.). For example, SVM's are configured via a learning or training phase within a classifier constructor and feature selection module. Thus, the classifier(s) can be used to automatically learn and perform a number of functions, including but not limited to determining according to a predetermined criteria when a data request can be delayed, when/which data request can be forwarded to a UE in a vulnerable state, how long should a particular data request be held/queued in a data store, when is a voice call likely to be dropped, etc. The criteria can include, but is not limited to, historical patterns, UE behavior, user preferences, service provider preferences and/or policies, UE device parameters, network load, radio conditions, application parameters or type of application associated with the data request, location/position/orientation of the UE, etc.

Figure 6:
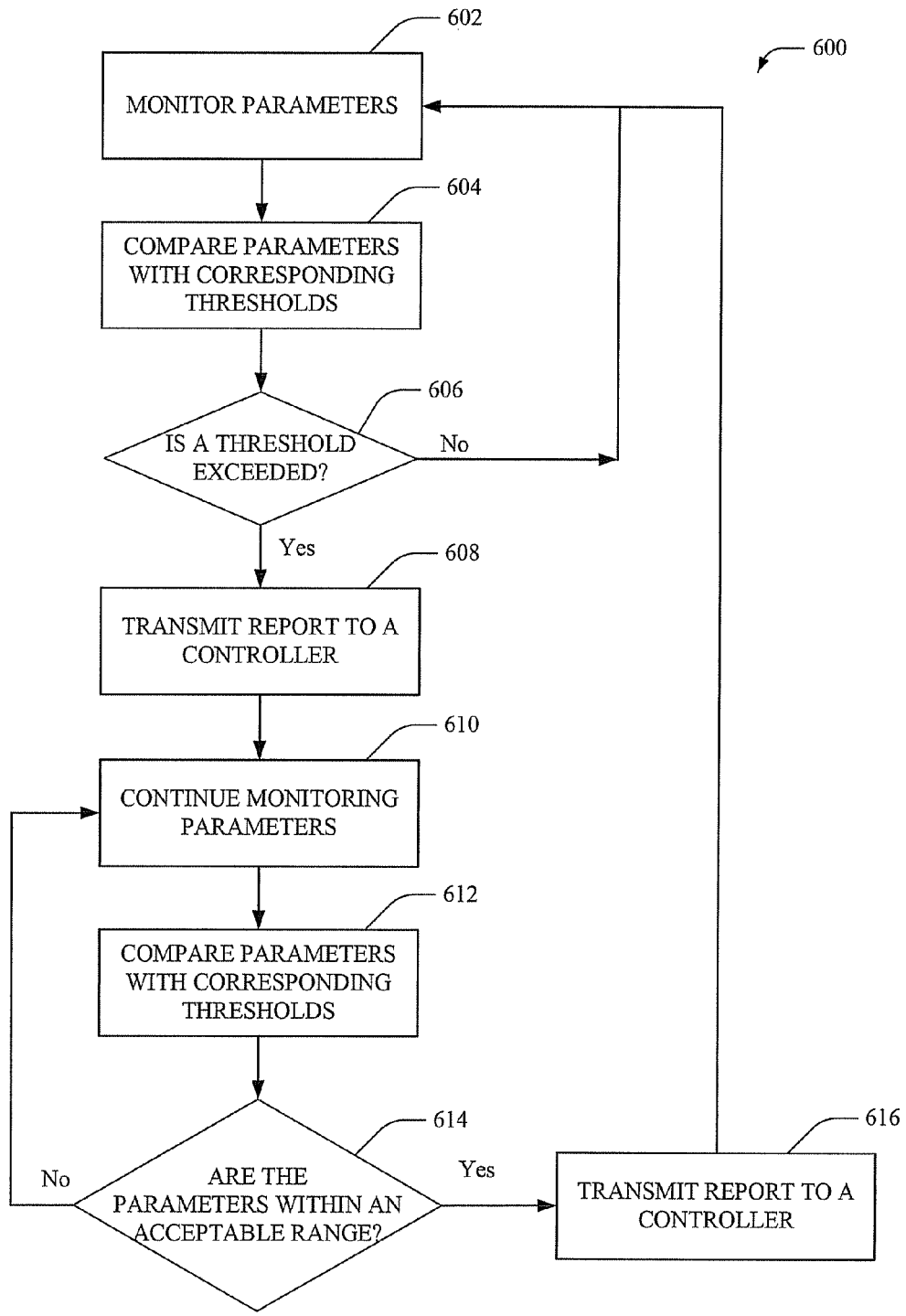
FIG. 6 illustrates an example methodology that can be utilized to facilitate dynamic and intelligent control of UE transitions between an mRAB session and a voice RAB session.
Figure 7:
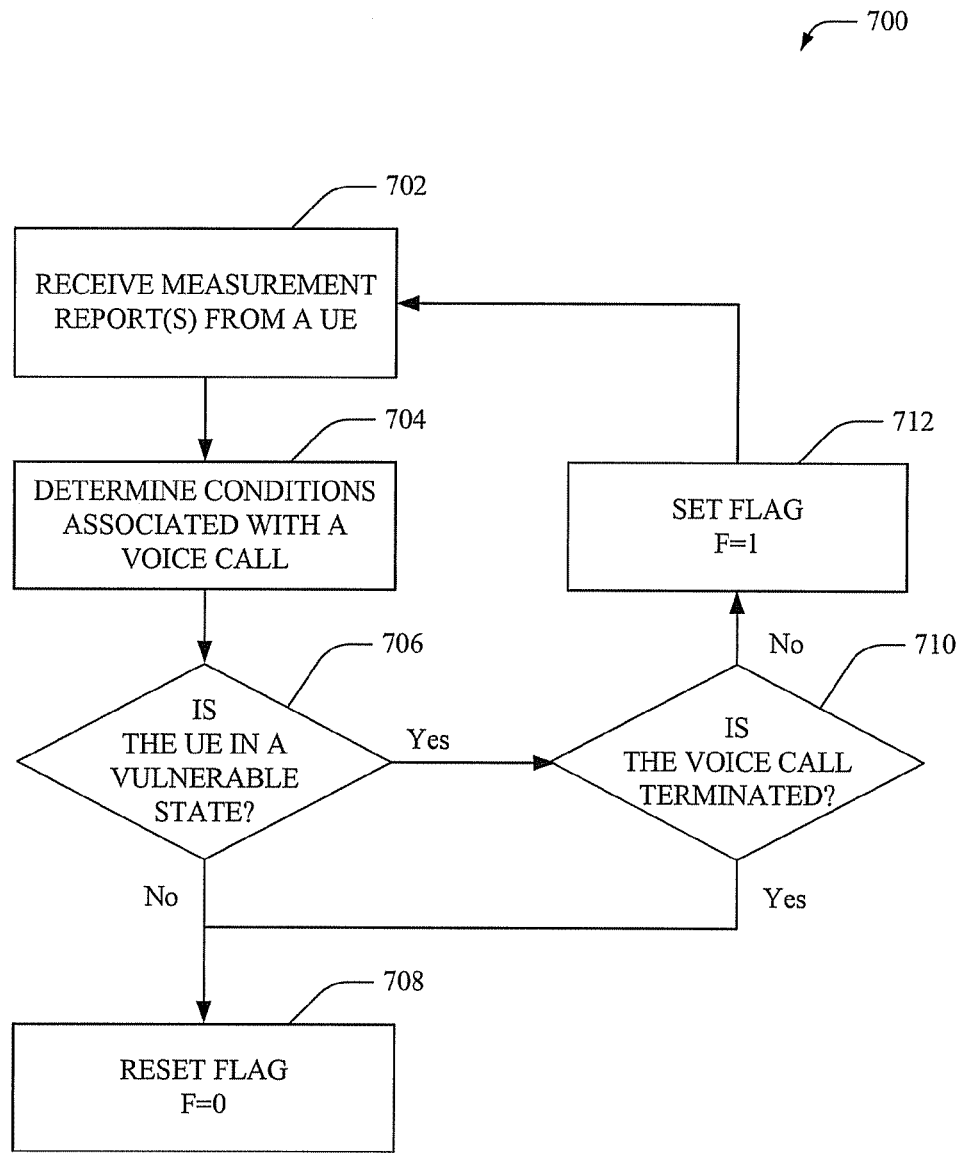
FIG. 7 illustrates an example methodology for detecting a vulnerability state of a UE, during a voice call.
Figure 8:
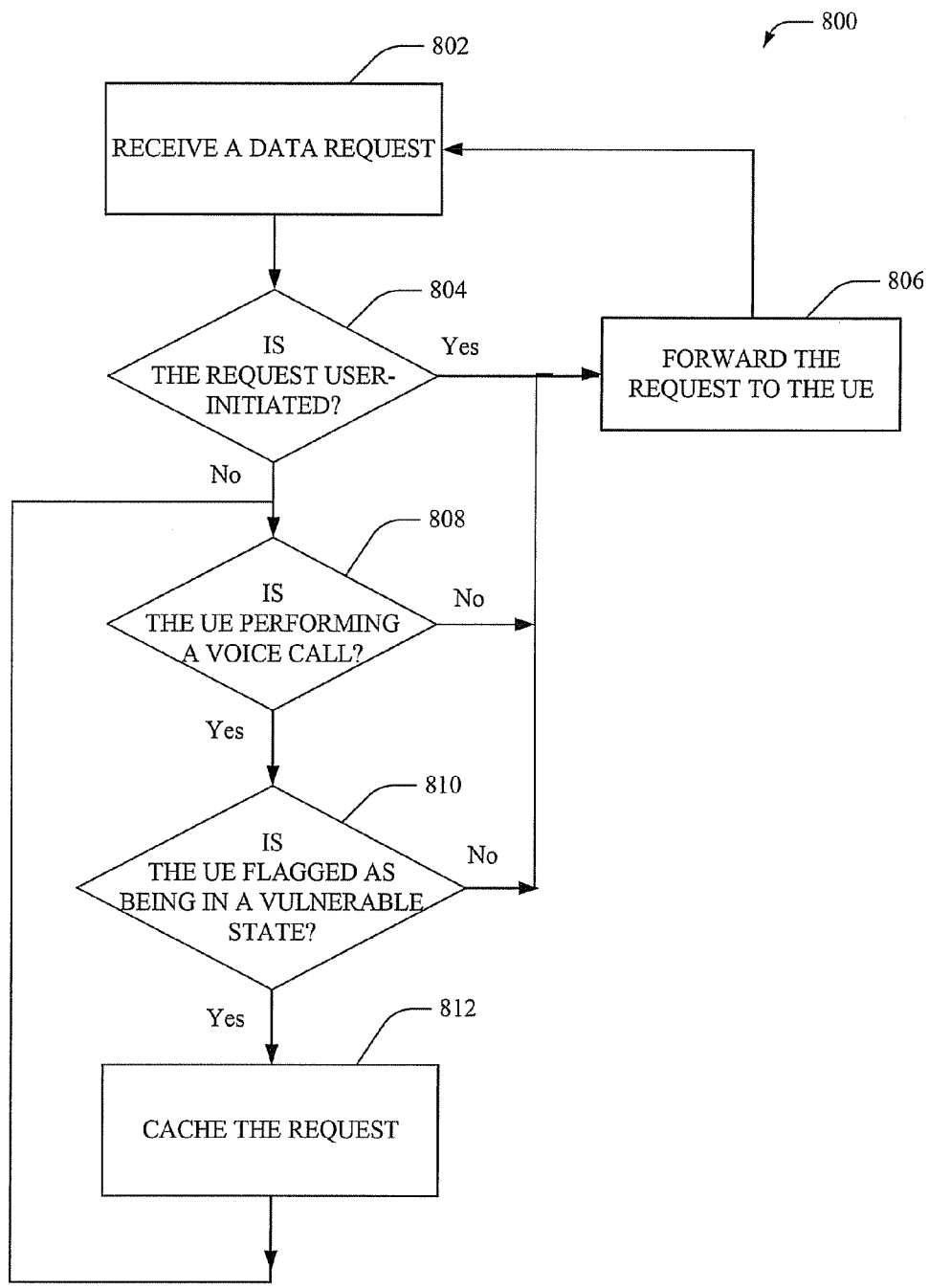
FIG. 8 illustrates an example methodology for dynamically controlling requests or notifications sent to a UE.

FIGS. 6-8 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or computer-readable storage/communications media.

Referring now to FIG. 6, illustrated is an example methodology 600 that can be utilized to facilitate dynamic and intelligent control of UE transitions between mRAB and voice RAB, according to an aspect of the subject disclosure. As an example, methodology 600 can be performed by a UE, such as, but not limited to, a cellular phone, a laptop, a tablet, a PC, a PDA, a netbook, a gaming module, a media player, a media recorder, a media viewer, etc. In one embodiment, methodology 600 facilitates collection and transmission of data that facilitates determination of a state (e.g., vulnerable state, normal state, etc.) of a voice call. For example, a vulnerable state for a voice call can be identified when the voice call is likely to be dropped, if an mRAB is set up. During this state, the UE can be denied network-initiated data requests. However, customer-initiated data requests can still be communicated to the UE. For example, voluntary effort by customers to manually reset notifications, updates, pushes, etc. can be supported along with other benefits such as battery life and improved performance.

According to an aspect, at 602, various parameters can be monitored. As an example, the parameters can include UL transmission power, a SIR target, an UL quality, a DL quality, Ec/Io, RSCP, etc. At 604, the parameters can be compared to corresponding thresholds, for example, predefined by a service provider, UE manufacturer and/or user. At 606, it can be determined whether one or more of the thresholds are exceeded. In other words, it can be identified whether one or more of the parameters are outside an acceptable/satisfactory range (or value). If none of the thresholds are exceeded, the methodology 600 returns to 602. Alternatively, if one or more thresholds are exceeded, at 608, a measurement report can be transmitted to a controller (e.g., RNC). The controller can analyze the reports to determine a state of the UE, which in turn can facilitate determination of whether a data request can be forwarded to the UE or not.

Further, at 610, the monitoring of the parameters is continued and at 612, the parameters can be compared to their corresponding thresholds. At 614, it can be determined whether all the parameters are within an acceptable range (e.g., do not exceed the thresholds). If the parameters are within the acceptable range, at 616 another report can be transmitted to the controller, notifying the controller that the parameters are not exceeding their thresholds. Accordingly, the controller can update the state of the UE. However, if the parameters are still not within the acceptable range, the methodology returns to 610.

FIG. 7 illustrates an example methodology 700 for detecting a vulnerability state of a UE, during a voice call. Methodology 700 can be performed by a mobility network element (e.g., RNC). Initially, at 702, measurement report(s) can be received from a UE. As an example, the measurement report(s) can include, monitored data (e.g., relating to the UEs surrounding radio environment), usage activity, alerts or events (e.g., indicating that a parameter threshold has been exceeded), etc. At 704, conditions (e.g., quality) associated with a voice call with the UE can be determined, based on an analysis of the measurement report(s). Moreover, at 706, it can be determined whether a UE is in a vulnerable state. In an example embodiment, a vulnerable state can include a scenario wherein the UE has a high probability of dropping the voice call, if a simultaneous data communication (via a data channel) or an additional data communication (via a data channel) is performed. In other words, a UE can be in the vulnerable state, if predicted or inferred that the voice call will be dropped after initiation of a simultaneous data bearer. The term "after" as used herein refers to a relative point in time, however small or long the delay period in between. If determined that the UE is not in a vulnerable state, at 708, a flag associated with the UE can be reset. Else, at 710, it can be determined whether the voice call has been terminated. If the voice call is not terminated, the flag can be set. Alternatively, if the voice call has been terminated, the flag can be reset. It can be appreciated that other designations beyond flags can be used to indicate vulnerable states or non-vulnerable states, according to an example embodiment. Likewise, there may be more than one vulnerable state, for example, such as a high, medium, and/or low-vulnerable state. Accordingly, in other embodiments, the appropriate flags, probabilities, or other designations may be used to indicate multiple vulnerable (or non-vulnerable) states. Many variations are possible without departing from example embodiments of the subject disclosure.

FIG. 8 illustrates an example methodology 800 for dynamically controlling requests or notifications sent to a UE, during a voice call in accordance with an aspect of the subject specification. Methodology 800 facilitates management of mRAB sessions with simultaneous voice and data to improve the quality of voice call and avoid or prevent dropped calls, which in turn can improve perceived end user experience. Methodology 800 can be implemented in 3GPP networks, such as, but not limited to UMTS, HSDPA, HSUPA, HSPA+, as well as non-3GPP and legacy networks.

At 802, a data request associated with a UE can be received. Further, at 804, it can be determined whether the request is user-initiated. In one example, user-initiated data requests are still allowed to be delivered to the UE. Moreover, voluntary effort by customers to manually reset notifications, updates, pushes, etc. can be supported along with other benefits such as battery life and improved performance. Accordingly, if the data request is user-initiated, at 806, the data request can be forwarded/delivered to the UE.

Alternatively, if the data request is not user-initiated (e.g., network-initiated), at 808, it can be determined whether the UE is performing a CS voice call. If not, the methodology 800 can proceed to 806 and the request can be forwarded/delivered to the UE. If determined that the UE is performing a voice call, the state of the UE is detected. Moreover, at 810, it can be identified whether the UE is flagged as being in a vulnerable state. In one example, a UE state can be continuously monitored (e.g., based on surrounding radio conditions) and the UE can be dynamically moved in and out of a "vulnerability" state. Moreover, the "vulnerability" state is based on a probability of dropping the voice call on establishment of an mRAB session. If the UE is not flagged as being in a vulnerable state, an mRAB session can be allowed, and at 806, the request can be forwarded/delivered to the UE. In contrast, if the UE is flagged as being in a vulnerable state, at 812, the request can be cached. Moreover, the cached request can be delivered to the UE only when the UE has terminated the voice call or the UE is no longer in a vulnerable state. In other words, as the radio propagation and interference environment changes rapidly, a request is cached only temporarily, and can be reinstated, as soon as the UE is in better radio conditions. It can be appreciated that flagging the UE is one non-limiting example of indicating a vulnerability state for the UE. Additionally or alternatively, most any other form of indication can be utilized. For example, a probability of a UE being vulnerable can be dynamically computed and compared to a corresponding threshold.

Figure 9:
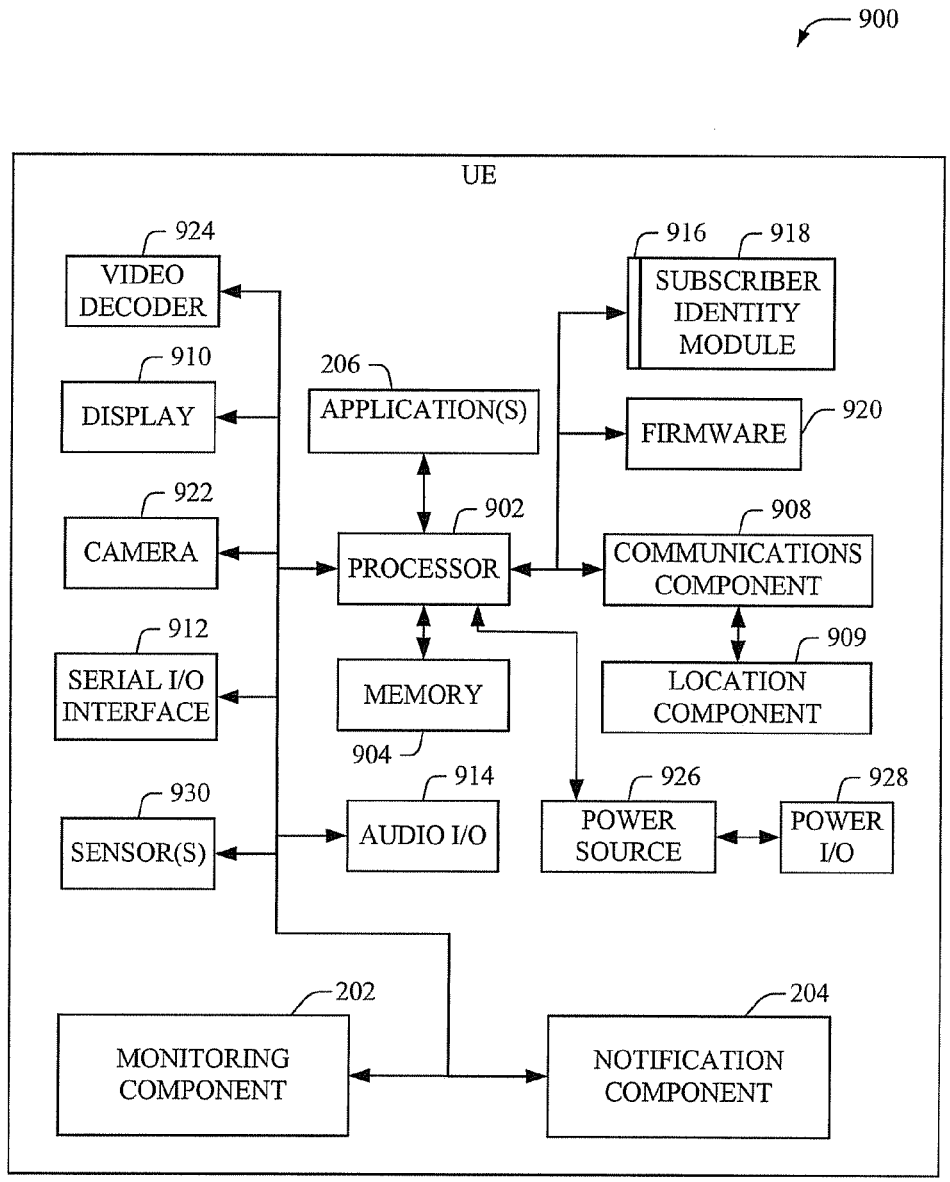
FIG. 9 illustrates a block diagram of a UE suitable for collecting and reporting data to facilitate efficient mRAB management in accordance with the innovation.

Referring now to FIG. 9, there is illustrated a block diagram of a UE 900 that reduces RNC load, based on UI in accordance with the innovation. The UE 900 can include a processor 902 for controlling all onboard operations and processes. A memory 904 can interface to the processor 902 for storage of data and one or more applications 906 being executed by the processor 902. A communications component 908 can interface to the processor 902 to facilitate wired/wireless communication with external systems (e.g., femtocell and macro cell). The communications component 908 interfaces to a location component 909 (e.g., GPS transceiver) that can facilitate location detection of the UE 900. Note that the location component 909 can also be included as part of the communications component 908.

The UE 900 can include a display 910 for displaying content downloaded and/or for displaying text information related to operating and using the device features. A serial I/O interface 912 is provided in communication with the processor 902 to facilitate serial communication (e.g., USB, and/or IEEE 1394) via a hardwire connection. Audio capabilities are provided with an audio I/O component 914, which can include a speaker for the output of audio signals related to, for example, recorded data or telephony voice data, and a microphone for inputting voice signals for recording and/or telephone conversations. In addition, sensor(s) 930 can be included to detect usage activity of the UE 900 and/or to detect position, motion and/or orientation of the UE 900.

The UE 900 can include a slot interface 916 for accommodating a subscriber identity module (SIM) 918. Firmware 920 is also provided to store and provide to the processor 902 startup and operational data. The UE 900 can also include an image capture component 922 such as a camera and/or a video decoder 924 for decoding encoded multimedia content. The UE 900 can also include a power source 926 in the form of batteries, which interfaces to an external power system or charging equipment via a power I/O component 928. In addition, the UE 900 can be substantially similar to and include functionality associated with UE 102 described herein. Moreover, UE 900 can include a monitoring component 202 and a notification component 204, which can include respective functionality, as more fully described herein, for example, with regard to systems 100-400.

Figure 10:
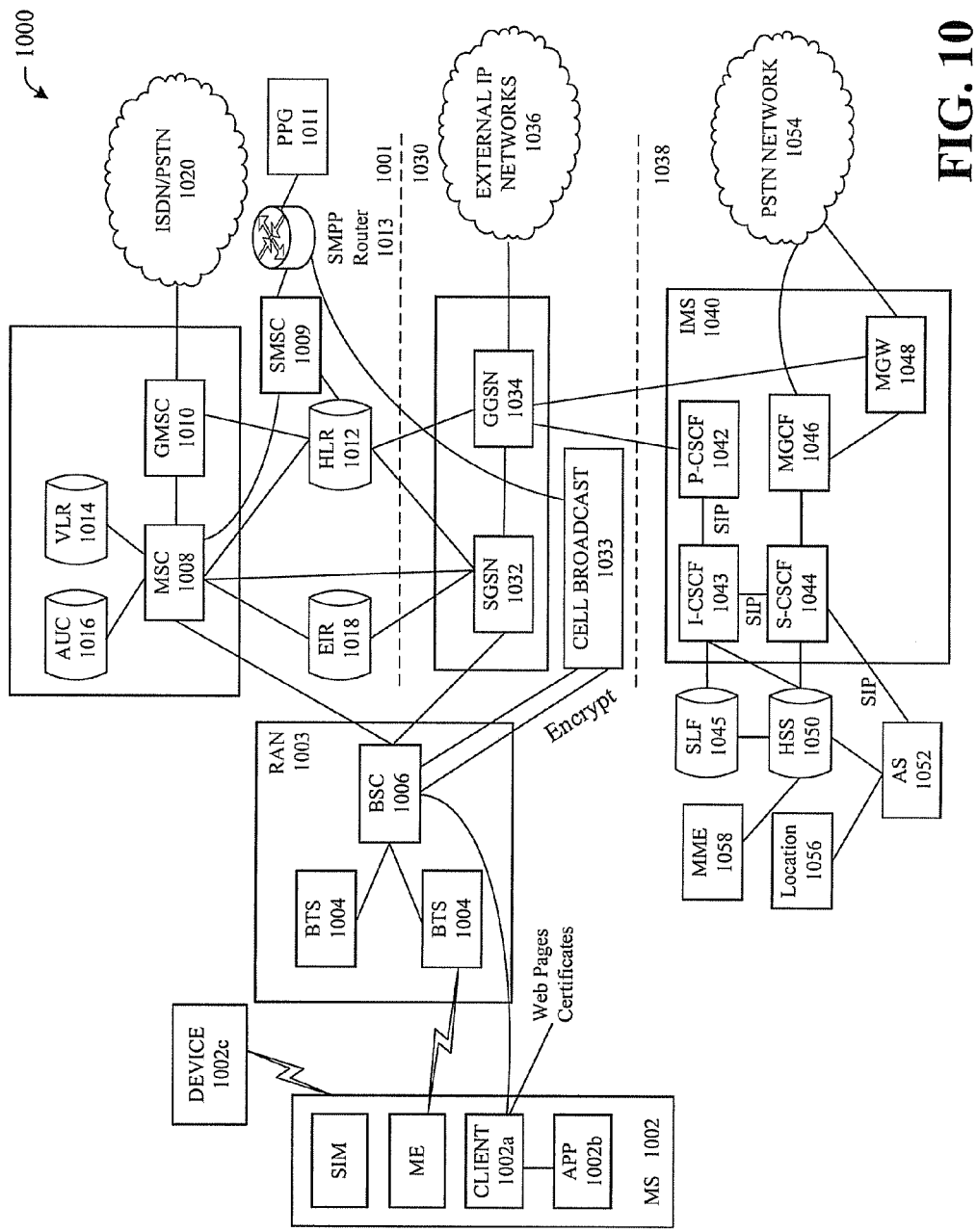
FIG. 10 illustrates a Global System for Mobile Communications (GSM)/General Packet Radio Service (GPRS)/Internet protocol (IP) multimedia network architecture that can employ the disclosed architecture.

Now turning to FIG. 10, such figure depicts an example GSM/GPRS/IP multimedia network architecture 1000 that can employ the disclosed communication architecture. In particular, the GSM/GPRS/IP multimedia network architecture 1000 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1002 includes an embedded client 1002a that receives and processes messages received by the MS 1002. The embedded client 1002a can be implemented in JAVA or another programming language and is discuss more fully below. It can be appreciated that MS 1002 can be substantially similar to UE 102 and 900, and can include functionality described with respect to UE 102 in systems 100-400 and 900.

The embedded client 1002a communicates with an application 1002b (e.g., application(s) 202) that provides services and/or information to an end user. Additionally or alternately, the MS 1002 and a device 1002c can be enabled to communicate via a short-range wireless communication link, such as BLUETOOTH®. As one of ordinary skill in the art would recognize, there can be an endless number of devices 1002c that use the SIM within the MS 1002 to provide services, information, data, audio, video, etc. to end users.

The BTS 1004 is physical equipment, such as a radio tower, that enables a radio interface to communicate with the MS 1002. Each BTS can serve more than one MS. The BSC 1006 manages radio resources, including the BTS. The BSC 1006 can be connected to several BTSs. Moreover, the BSC 1006 can be substantially similar to RNC 106 disclosed herein and can include functionality described herein with respect to RNC 106. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1016, and an Equipment Identity Register (EIR) 1018. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. In other words, the GMSC 1010 provides interworking functionality with external networks.

The HLR 1012 is a database or component(s) that comprises administrative information regarding each subscriber registered in a corresponding GSM network. The HLR 1012 also includes the current location of each MS. The VLR 1014 is a database or component(s) that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (e.g., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. In one aspect, the location update is periodically performed to update the database as location-updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations, security functions, and access controls.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN. In a GSM/GPRS network, GPRS services and GSM services can be used in parallel. A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 can be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 can also modify an outgoing request according to a set of rules defined by the network operator (for example, address analysis and potential modification).

The I-CSCF 1043 forms an entrance to a home network and hides the inner topology of the home network from other networks and provides flexibility for selecting an S-CSCF. The I-CSCF 1043 can contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002. The mobility management entity (MME) 1058 provides authentication of a user by interacting with the HSS 1050 in LTE networks.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with a PSTN network 1054 for TDM trunks. In addition, the MGCF 1046 communicates with the PSTN network 1054 for SS7 links.

Figure 11:
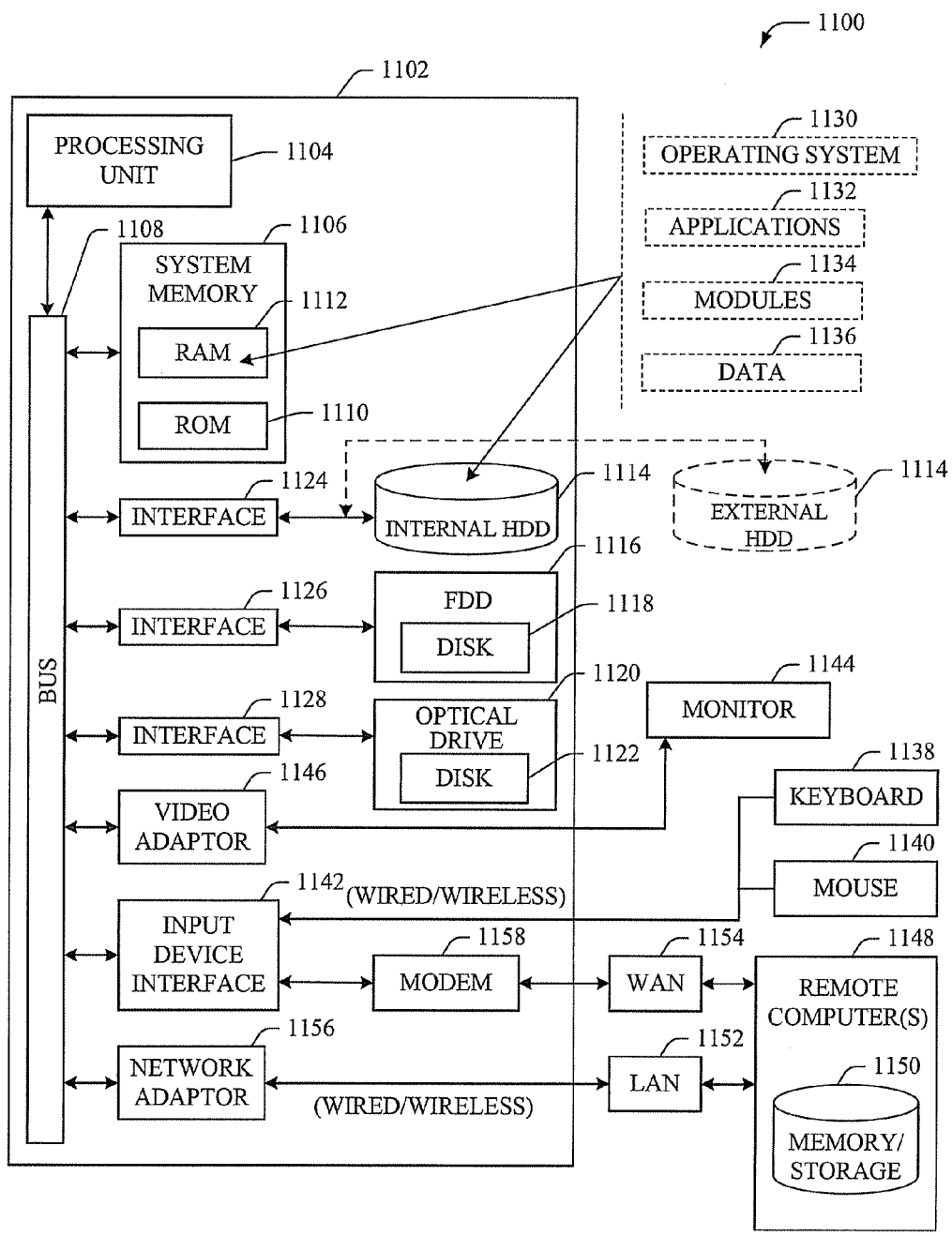
FIG. 11 illustrates a block diagram of a computer operable to execute the disclosed communication architecture.

Referring now to FIG. 11, there is illustrated a block diagram of a computer operable to execute the disclosed communication architecture. In order to provide additional context for various aspects of the subject specification, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Program modules can include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various aspects of the specification includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the specification can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer can include other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and can include many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are example and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. In an example embodiment, wireless communications can be facilitated, for example, using Wi-Fi, Bluetooth™, Zigbee, and other 802.XX wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n etc.) to provide secure, reliable, fast wireless connectivity. A Wi-Fi network can be used to connect computers to each other, to the Internet, and to wired networks (which use IEEE 802.3 or Ethernet). Wi-Fi networks can operate in the unlicensed 2.4 and 5 GHz radio bands, at an 11 Mbps (802.11a), 54 Mbps (802.11b), or 150 Mbps (802.11n) data rate, for example, or with products that contain both bands (dual band), so the networks can provide real-world performance similar to wired Ethernet networks used in many homes and offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," (e.g., 110, 202, 204, 304, etc.), "module," (e.g., 918, 1134, etc.), "system," (e.g., 100-400, 1140, 1130, etc.), "interface," (e.g., 912, 1124, 1126, 1128, 1142, etc.), or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   determining probability data from sensor data associated with a user equipment, wherein the probability data is indicative of a probability of a voice call, associated with the user equipment, being dropped in response to a multiple radio access bearer session being initiated concurrently with the voice call; and
   in response to determining that the probability data satisfies a defined probability criterion associated with a parameter value pertaining to the sensor data, prohibiting an initiation of the multiple radio access bearer session, comprising storing, in a data store, a data request directed to the user equipment from a network device, and, in response to determining that the probability data satisfies another defined probability criterion associated with the parameter value, delivering the data request stored in the data store to the user equipment.

2. The system of claim 1, wherein the operations further comprise:
sending, to a radio network controller via a network device, report data indicative of a radio condition determined based on the probability data.

3. The system of claim 1, wherein the multiple radio access bearer session includes a data communication performed concurrently with the voice call.

4. The system of claim 1, wherein the determining the probability data comprises receiving report data indicative of a radio condition measured by the user equipment during the voice call.

5. The system of claim 1, wherein the operations further comprise:
in response to the determining that the probability data satisfies the defined probability criterion, generating status data that is indicative of a vulnerability state of the user equipment.

6. The system of claim 5, wherein the operations further comprise:
storing the status data in a data store.

7. The system of claim 6, wherein the operations further comprise:
in response to determining a change in the status data, updating the status data stored in the data store.

8. The system of claim 1, wherein the prohibiting comprises prohibiting the initiation based on display data that represents that a screen of the user equipment has been switched off.

9. A method, comprising:
receiving, by a radio network controller device comprising a processor, sensor data from a user equipment;
determining, by the radio network controller device, that probability data, representing a probability that a voice call associated with the user equipment will be dropped after initiating a communication over a data radio access bearer, satisfies a defined probability criterion, the probability data being determined based on the sensor data; and
in response to the determining, delaying, by the radio network controller device, an establishment of the data radio access bearer between the user equipment and the radio network controller device until determined that the probability data satisfies another defined probability criterion associated with the sensor data.

10. The method of claim 9, wherein the receiving comprises receiving radio environment measurement data from the user equipment.

11. The method of claim 9, further comprising:
receiving, by the radio network controller device, request data representing a request for transferring the communication from a packet core switching node device to the user equipment.

12. The method of claim 11, wherein the delaying comprises delaying the establishment in response to determining that the request data has not been initiated by the user equipment.

13. The method of claim 9, wherein the delaying comprises delaying the establishment in response to determining, based on display data received from the user equipment, that a screen of the user equipment has been turned off.

14. The method of claim 9, wherein the delaying comprises caching request data associated with the communication until determined that the probability data satisfies the other defined probability criterion associated with the sensor data.

15. The method of claim 9, wherein the delaying comprises delaying the establishment in response to determining, based on display data received from the user equipment, that video data associated with an application of the user equipment is not being presented in the foreground of a screen of the user equipment.

16. The method of claim 9, further comprising:
in response to the delaying, directing, by the radio network controller device, instruction data to a network device, wherein the instruction data is employable to instruct the network device to enter a quarantine mode, and wherein a network-initiated paging attempt directed to the user equipment is restricted during the quarantine mode.

17. A non-transitory machine-readable storage medium comprising executable instructions that, when executed by a processor, facilitate performance of operations, comprising:
determining device data indicative of a condition associated with a mobile device; and
in response to a data request being received during an ongoing voice call with the mobile device, transmitting the device data to a radio network controller device, wherein the device data is employable to delay an establishment of a multiple radio access bearer by storing, in a data store, the data request, and, in response to determining other device data indicative of another condition associated with the mobile device, transmitting the data request stored in the data store to the mobile device.

18. The non-transitory machine-readable storage medium of claim 17, wherein the device data comprises power data representing an uplink transmission power of the mobile device.

19. The non-transitory machine-readable storage medium of claim 17, wherein the device data comprises a parameter value associated with a radio environment surrounding the mobile device, and the transmitting comprises transmitting the device data in response to the parameter value being determined to satisfy a defined parameter criterion.

20. The non-transitory machine-readable storage medium of claim 17, wherein the device data comprises display data associated with an output interface of the mobile device.

* * * * *